(12) United States Patent
Li

(10) Patent No.: US 8,417,073 B2
(45) Date of Patent: Apr. 9, 2013

(54) CIRCUIT ARCHITECTURE FOR ELECTRO-OPTIC MODULATION BASED ON FREE CARRIER DISPERSION EFFECT AND THE WAVEGUIDE CAPACITOR STRUCTURES FOR SUCH MODULATOR CIRCUITRY USING CMOS OR BI-CMOS PROCESS

(76) Inventor: Bing Li, Bothell, WA (US)

( * ) Notice: Subject to any disclaimer, the term of this patent is extended or adjusted under 35 U.S.C. 154(b) by 0 days.

(21) Appl. No.: 13/191,301

(22) Filed: Jul. 26, 2011

(65) Prior Publication Data
US 2012/0045162 A1 Feb. 23, 2012

Related U.S. Application Data

(60) Continuation of application No. 12/906,863, filed on Oct. 18, 2010, now Pat. No. 7,991,249, which is a division of application No. 11/756,490, filed on Aug. 23, 2007, now Pat. No. 7,817, 881.

(60) Provisional application No. 60/810,684, filed on Jun. 1, 2006.

(51) Int. Cl.
G02B 6/12 (2006.01)

(52) U.S. Cl.
USPC ................ 385/14; 385/15; 385/31; 385/32; 385/37

(58) Field of Classification Search ............. 349/14, 349/15, 31, 32; 385/14, 15, 31, 32, 37
See application file for complete search history.

(56) References Cited

U.S. PATENT DOCUMENTS

| | | | |
|---|---|---|---|
| 5,220,296 A * | 6/1993 | von Flotow et al. ........ 333/24 R |
| 5,355,422 A | 10/1994 | Sullivan et al. | |
| 5,963,688 A * | 10/1999 | Campi et al. .................... 385/50 |
| 6,654,729 B1 | 11/2003 | Hickman et al. | |
| 6,999,670 B1 | 2/2006 | Gunn, III et al. | |
| 7,010,208 B1 | 3/2006 | Gunn, III et al. | |
| 7,136,544 B1 | 11/2006 | Gunn, III et al. | |
| 7,474,973 B2 | 1/2009 | Goodwin | |
| 7,817,881 B2 | 10/2010 | Li | |
| 7,991,249 B2 | 8/2011 | Li | |
| 2002/0110309 A1 | 8/2002 | Devaux et al. | |
| 2005/0123242 A1* | 6/2005 | Walker et al. ................... 385/40 |
| 2006/0008223 A1 | 1/2006 | Gunn, III et al. | |
| 2007/0292073 A1 | 12/2007 | Li | |

OTHER PUBLICATIONS

Beiju et al., "A High-Performance Silicon Electro-Optic Phase Modulator with a Triple MOS Capacitor," Chinese Journal of Semiconductors, vol. 27, No. 12, Dec. 2006, pp. 2089-2093.
Liao et al., "High speed silicon Mach-Zehnder modulator," Optics Express, vol. 13, No. 8, Apr. 18, 2005, pp. 3129-3135.
Liu et al., "Recent advances in high speed silicon optical modulator," Proc. of SPIE vol. 6477, (2007), pp. 1-9.

* cited by examiner

Primary Examiner — Jennifer Doan
(74) Attorney, Agent, or Firm — Vidas, Arrett & Steinkraus

(57) ABSTRACT

New circuit architecture for electro-optic modulator based on free-carrier dispersion effect is invented, in which the waveguide capacitor of the modulator is embed in the circuits and physically layout together with transistors, the switching of the modulator occurs in transistors, and as the result, the electro-optical modulation occurs in the waveguide capacitor. The invented modulator is not one physical device, it is actually a circuit. Several circuit design techniques are imported, leading to several new modulator circuits that have very high operation speed and very small power consumption. Several new waveguide capacitor structures are also invented that allow high efficient modulator circuits to be built.

13 Claims, 8 Drawing Sheets

US 8,417,073 B2

CIRCUIT ARCHITECTURE FOR ELECTRO-OPTIC MODULATION BASED ON FREE CARRIER DISPERSION EFFECT AND THE WAVEGUIDE CAPACITOR STRUCTURES FOR SUCH MODULATOR CIRCUITRY USING CMOS OR BI-CMOS PROCESS

CROSS-REFERENCE TO RELATED APPLICATIONS

This application is a continuation of U.S. patent application Ser. No. 12/906,863, filed Oct. 18, 2010, which is a divisional of U.S. patent application Ser. No. 11/756,490, filed May 31, 2007, which claims the benefit of U.S. Provisional Patent Application No. 60/810,684, filed Jun. 1, 2006, the entire contents of which are hereby incorporated by reference in their entirety.

BACKGROUND OF THE INVENTION

The external high-speed electro-optic modulator is a necessary device for varieties of optical communication systems, where the direct modulation of the laser is not applicable due to either operation speed limitation or the frequency chirp or poor signal integrality causing unbearable impairment during the transmission.

Being able to fabricate the electro-optic modulator on silicon using standard VLSI process possesses the advantages of low-cost and easy integration with electronics. Recently, extensive efforts of developing electro-optic modulator on silicon have been taken, and lots of breakthrough development. The published works include forward biased PIN diode structure[1][2] and metal-on-semiconductor (MOS) capacitance structure[3], which was able to demonstrate lGbps operation speed. The inventor of this patent has made the most critical original contribution to this field, and successfully demonstrated the first 10 Gbps silicon EO modulator fabricated standard CMOS process. The attached patent documents[4-6] present part of the silicon modulator technologies that the inventor have developed in the past.
1. P. D. Hewitt and G. T. Reed, "Improved modulation performance of a silicon p-i-n device by trench isolation," J. of *Lightwave Technology*, Vol. 19, No. 3, pp 387-390, March 2001.
2. Giuseppe Coppola, Andrea Irace, Mario Iodice, Antonello Cutolo, "Simulation and analysis of a high-efficiency silicon optoelectronic modulator based on a Bragg mirror," *Opt. Eng.* 40(6), 1076-1082 (June 2001).
3. "A high speed silicon optical modulator based on metal-oxide-semiconductor capacitor". Nature, vol. 427, 2004, page 615-618.
4. Integrated optical and electronic devices (CMOS Optics). Luxtera Inc., application Ser. No. 10/606,297.
5. Active waveguides for optoelectronic devices. Luxtera Inc., application Ser. No. 10/650,234.
6. High-speed electro-optic modulator on silicon SOI using periodical distributed lateral abrupt PN diode structure. Luxtera Inc., provisional application No. 60/495,402.

BRIEF SUMMARY OF THE INVENTION

All the previous designs and inventions have regarded the EO modulator as a device, in which the physical device of the modulator is separated from its driving electronics. This conventional technique does not take the advantage of the monolithic integration between transistors and optical waveguides. The performance is fundamentally limited due to the separation of the driving electronics and the optical waveguide itself.

In this invention, I discard this conventional design concept. The EO modulators invented in this application are actually circuits: the electrical-optical interaction occurs in the waveguide-capacitor, which is seamlessly, in one body or distributive manner, part of a modulator-circuit. In such way, many existing circuit design techniques can be used in the EO modulator design. The invention will show that the modulator based on free-carrier dispersion design is noting but a switching circuit design. This new design approach and the modulator circuits can improve the performance of the modulator to its physical limit, in both operation speed and power consumption.

The invention comprises the design approach, fundamental structure, and a variety of high performance EO modulator-circuits based on free-carrier dispersion effect, and several new waveguide capacitor structures that can be used the modulator circuits.

DETAIL DESCRIPTION OF THE INVENTION

Figure 1:
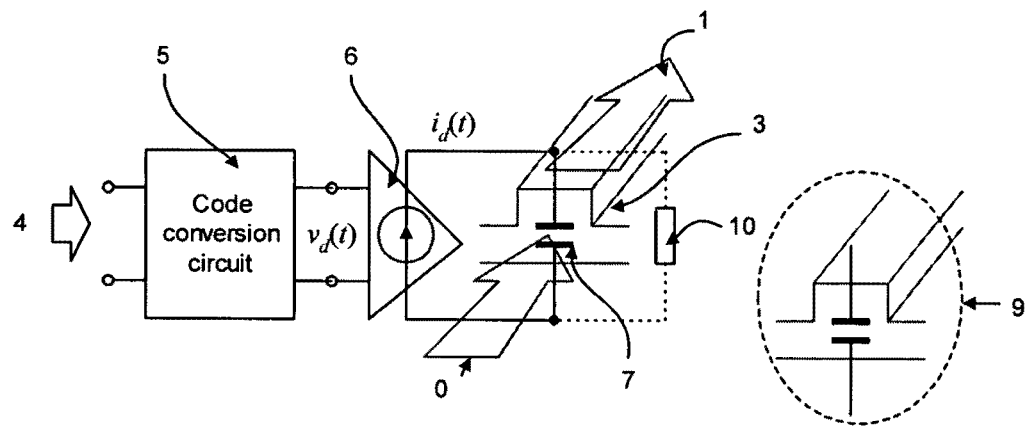
FIG. 1 shows an embodiment of a modulator circuit.

FIG. 1 illustrates the invented modulator circuit in concept, in the figure:
  <0>: the input light to the electro-optical modulation circuit;
  <1>: the output light from the electro-optical modulation circuit, which has been modulated by the driving electrical signal;
  <3>: the optical waveguide body, in which the lightwave is guided (confined);
  <4>: the input (driving) electrical signal (data);
  <5>: the code conversion circuit;
  <6>: controlled current source;
  <7>: the waveguide capacitor 担 symbol representative in the electro-optic modulation circuit;
  <9>: the waveguide capacitor, in which is the common physical body of the optical waveguide and the modulator-capacitor;
  <10>: the self-discharge path of the waveguide capacitor;

The capacitor inside the waveguide cross section represents all types of possible structures (PIN, reverse PN, and MOS, etc.), plus the new modulator-capacitor structures that will be described in this application. Those new modulator-capacitor structures are also part of this invention.

In circuits, the way to charge a capacitor is to pump current through it. The charge accumulated inside capacitor can be solved by the following differential equation is:

$$\frac{dQ}{dt} = i_d(t) - \frac{Q}{C(Q) \cdot R} \qquad (1)$$

where $i_d(t)$ is the charging current from the voltage-controlled current source in the modulator circuit. The R represents the self-discharge path <10>. It could be the parasitic parallel resistance of the capacitor. It could also be the self-recombination of the hole and electrons inside the PIN junction, if so, the $C(Q) \cdot R$ should be replaced by the time constant determined by the minority carrier lifetime.

Since the carrier density inside the waveguide volume is directly proportional to the charge Q, which determines the refractive index of the semiconductor material, silicon or III-V, by the free carrier dispersion effect, the charge Q in equation (1) actually represents the phase (intensity) of the lightwave after the modulator waveguide (interferometer).

We find that, as presented by FIG. 1, the modulator design problem is actually a circuit design problem. What we need to do is to design the circuit to produce the $i_d(t)$ such that the solution of the equation (1) is the data waveform required. To avoid propagation delay, the voltage-controlled current source circuit <6> must have ignorable distance from the waveguide capacitor <9>. In addition, as one will find later, the voltage signal $v_d(t)$ usually needs to be pulse signal that has much wider bandwidth than the input data. So, the code conversion circuit <5> must stay together with the rest of modulator circuits as well. This circuit-based modulator is only possible when we can realize the monolithic integration of electronic circuits and optical waveguide.

Using CMOS or SiGe BiCMOS process, we can monolithic integrate electronic circuits and photonic waveguide circuits together.

INVENTION EMBODIMENT 1

Edge-Triggered One-Shot Circuit Driving Charge Pump Modulator Circuit

Figure 2:
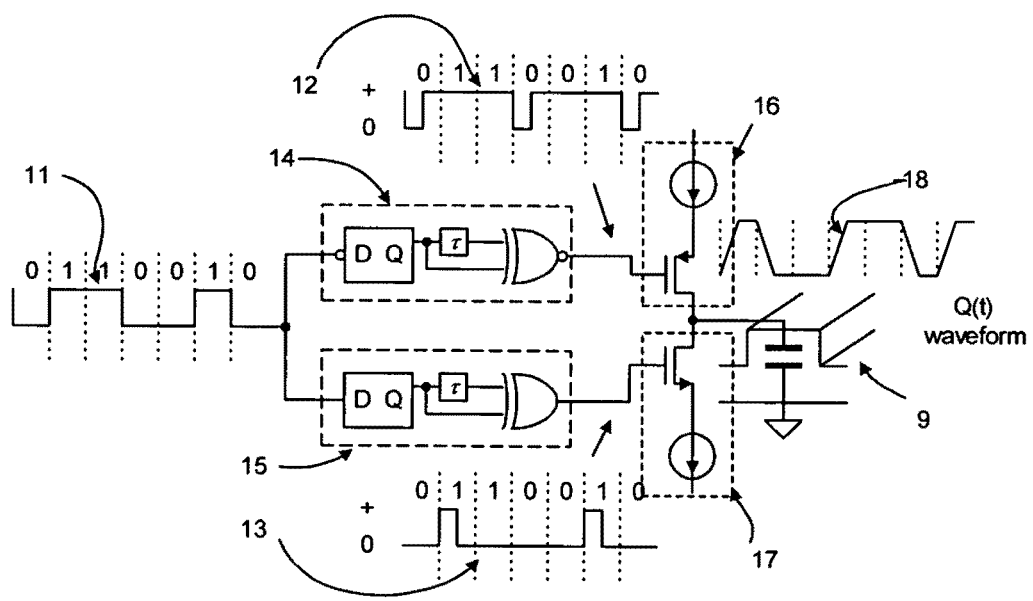
FIG. 2 shows an embodiment of a modulator circuit in greater detail.

FIG. 2 gives an edge-triggered one-shot circuit driving charge pump modulation circuit, in the figure:
<11>: the input electrical data, which is a non-return-zero (NRZ) code;
<12>: the output of the code conversion, corresponding to the rising edge of the input data <11>;
<13>: the output of the code conversion, corresponding to the falling edge of the input data <11>;
<14>: rising edge triggered one-shot circuit, which generates <12>;
<15>: falling edge triggered one-shot circuit, which generates <13>;
<16>: charge pump circuit to charge the waveguide capacitor of the modulation circuit;
<17>: charge pump circuit to discharge the waveguide capacitor of the modulation circuit;
<18>: the waveform of the charge accumulated in the waveguide capacitor Q(t);

If the waveguide capacitor uses the majority carrier of the semiconductor, the self-discharge path can be ignored; the equation (1) can be simplified to:

$$\frac{dQ}{dt} = i_d(t) \qquad (2)$$

The required Q(t) is a NRZ data waveform. The code conversion circuits can be an edge triggered one-shot circuit <14><15>, and the voltage-controlled current source can be a simple charge pump circuit <16><17> as shown in FIG. 2. The input NRZ data <11> drives two edge triggered one-shot circuits, one responds to the rising edge of the data, and the other responds to the falling edge of the data. The pulse width of one-shot 捆 output can be adjusted by the delay time τ. After the code conversion (two parallel edge triggered one-shot circuits), two parallel $v_d(t)$ signals are generated, each controls half of the charge pump. The resulted Q(t) waveform becomes the NRZ data as needed, with the rise and fall time equal to the pulse width of the $v_d(t)$.

INVENTION EMBODIMENT 2

Low Power-Consuming Electro-Optical Modulator Circuit Using Resonator Switching

Since changing the refraction index of silicon is realized by manipulating the carrier density (either majority carrier density or minority carrier density), driving the modulator is actually charging or discharging the semiconductor junction capacitor or other capacitance structure in semiconductor (for example, MOS capacitor). In traveling wave devices, the electrical energy will propagate along the device and eventually dissipated at the termination end. The device invented here will allow us to re-use that energy for the following bits. Another description for this is, assuming always drive the modulator by return-to-zero (RZ) data, when the charging and discharging finished for one bit (logic 1 at that current bit), the energy released from the modulator-capacitor will be stored in somewhere else. If the following bit is also logic 1, the stored energy will be injected back to the modulator-capacitor and then released (charging and discharging) again. If the following bit is logic 0, then do nothing (keep holding the energy in that 捞 omewhere else?.

Figure 3:
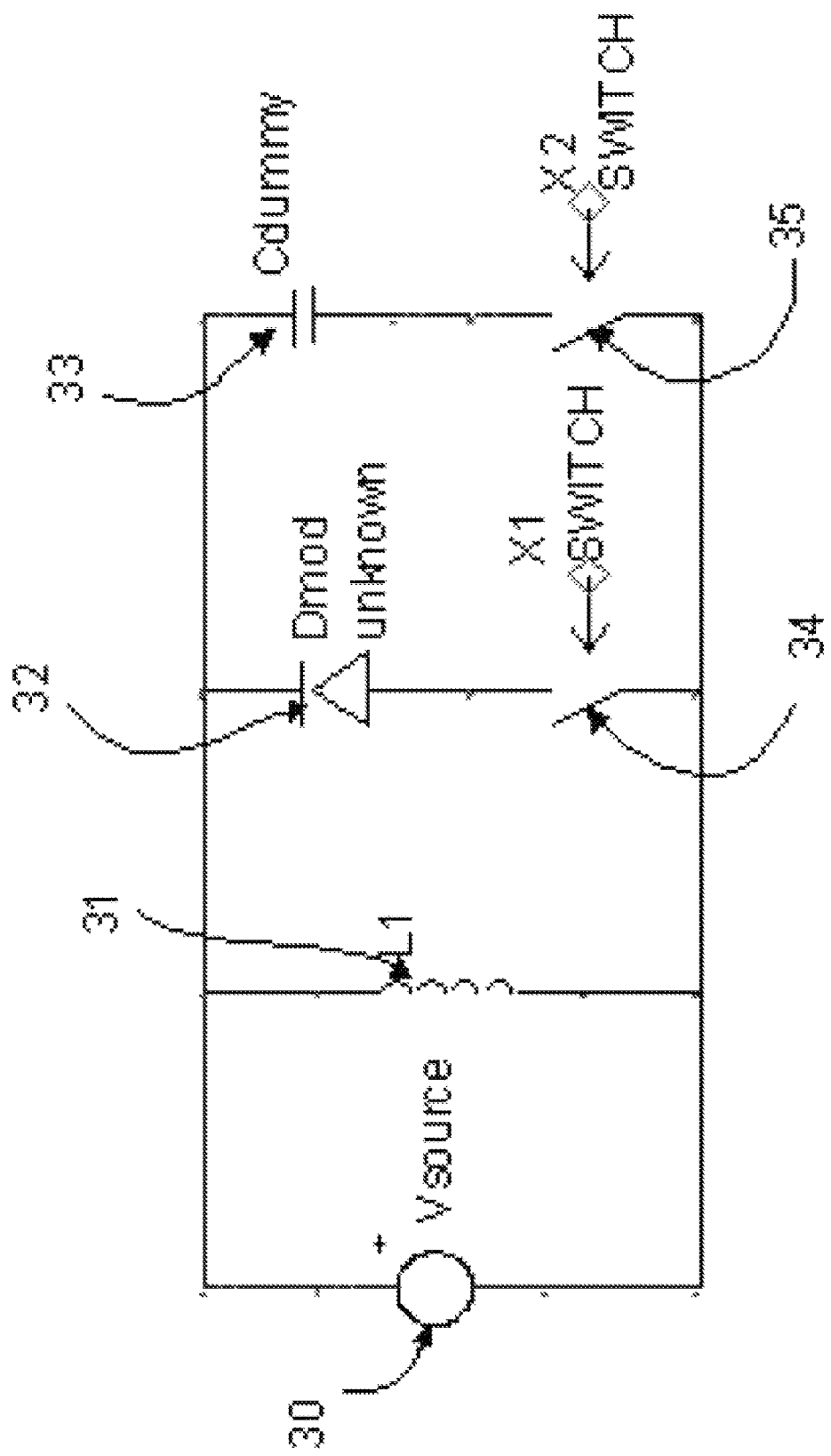
FIG. 3 shows an embodiment of a switched-oscillator modulator circuit.

The way of realize such procedure is to construct a resonator with switched capacitor, as shown in FIG. 3, in the figure:
<30>: the power to maintain the oscillation;
<31>: the inductor L1;
<32>: the waveguide capacitor formed by diode junction (Dmod);
<33>: the image capacitor (Cdummy) of the waveguide capacitor (Dmod), Cdummy needs to have the exact same value as <32>;
<34>: the switch for the resonator circuit of the modulation (X1);
<35>: the switch for the image resonator circuit (X2);

The way it works is, assuming at the first oscillation cycle, the Dmod is charged to the top voltage level and then discharged completely, at that moment, the current flowing through the inductor L1 is at the maximum (electrical field energy in Dmod is released and stored in L1 as magnetic field energy). In the following next bit period, if the bit is logic 0, X1 will be switched off and X2 will be switched on, the recharging will be performed from L1 to Cdummy. The cycle will be continued until another logic 1 comes in, then X1 will be switched on and X2 will be switched off. The oscillation cycle goes back between L1 and Dmod. Either X1 or X2 will be switched on at any given time but not both. The Vsource is just a power source to maintain the oscillation to overcome the parasitic ohm loss.

Figure 4:
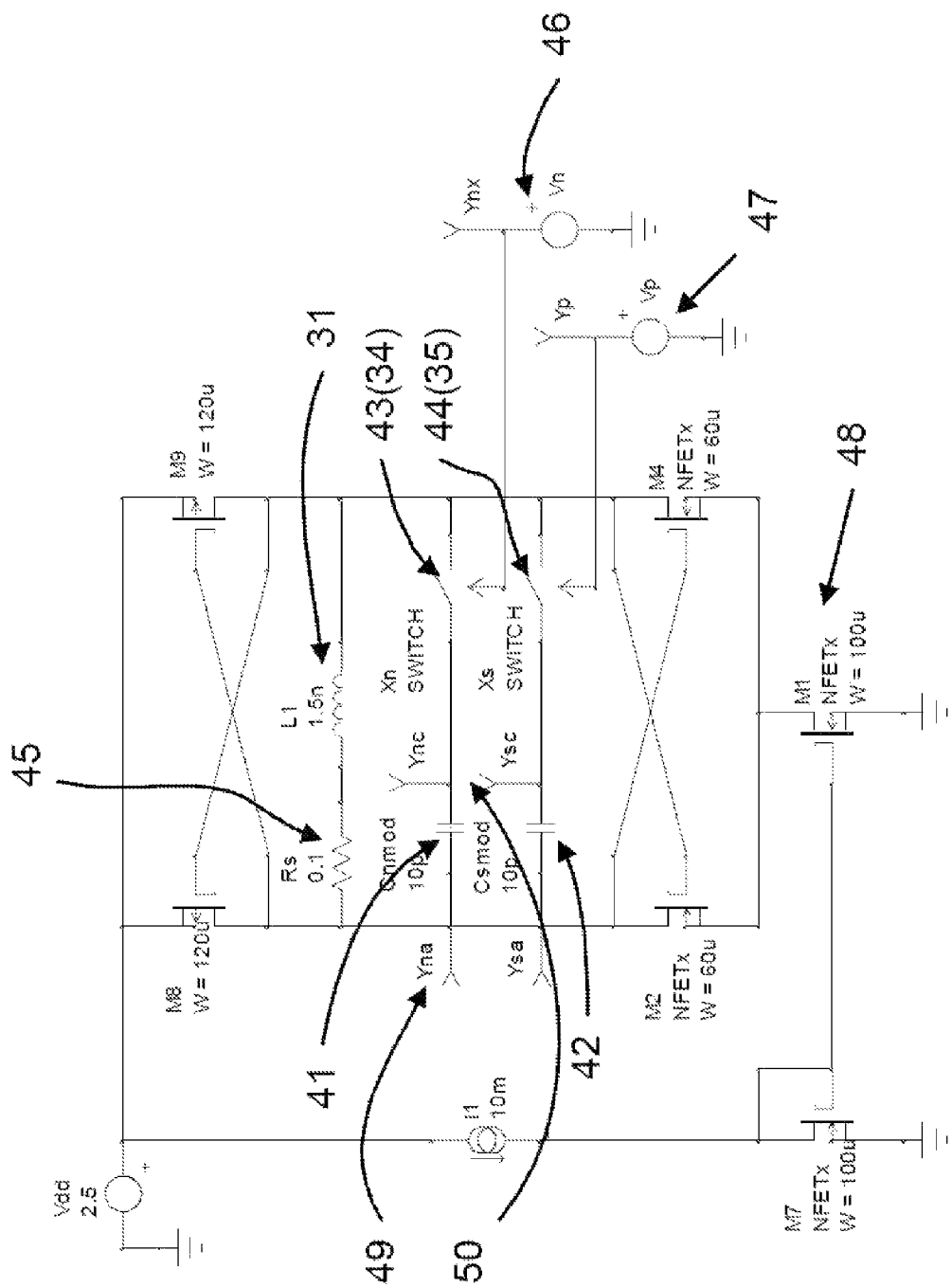
FIG. 4 shows an embodiment of a switched-oscillator modulator circuit in greater detail.

FIG. 4 illustrates a practical implementation of such device, in the figure:
- <41>: the waveguide capacitor 1 (Cnmod), which is one of the arms of the Mach-Zehnder Interferometer;
- <42>: the waveguide capacitor 2 (Csmod), which is another arm of the Mach-Zehnder Interferometer;
- <43>: the same as <34>;
- <44>: the same as <35>;
- <45>: the parasitic resistance in the resonator circuits;
- <46>: the input electrical signal controlling <43>;
- <47>: the input electrical signal controlling <44>;
- <48>: the power source supplying power to the resonator circuits;
- <49>: the terminal 1 of the waveguide capacitor (Cnmod);
- <50>: the terminal 2 of the waveguide capacitor (Cnmod);

In practice, the Cdummy <33> in FIG. 3 can be replaced by another waveguide arm of the Mach-Zehnder interferometer (MZI) of the modulator, which is the case in FIG. 4: the Cnmod <41> represent the modulator-capacitor on north arm of the MZ interferometer, and the Csmod <42> represent the modulator-capacitor on the south arm of the MZ interferometer. Due to the fact that the data applied on the two arms of the MZI are always complementary, whenever Cnmod is charged, Csmod shall not be charged. The oscillator is using the source coupled topology. The current source Ml is pumping the LC resonator.

Figure 5:
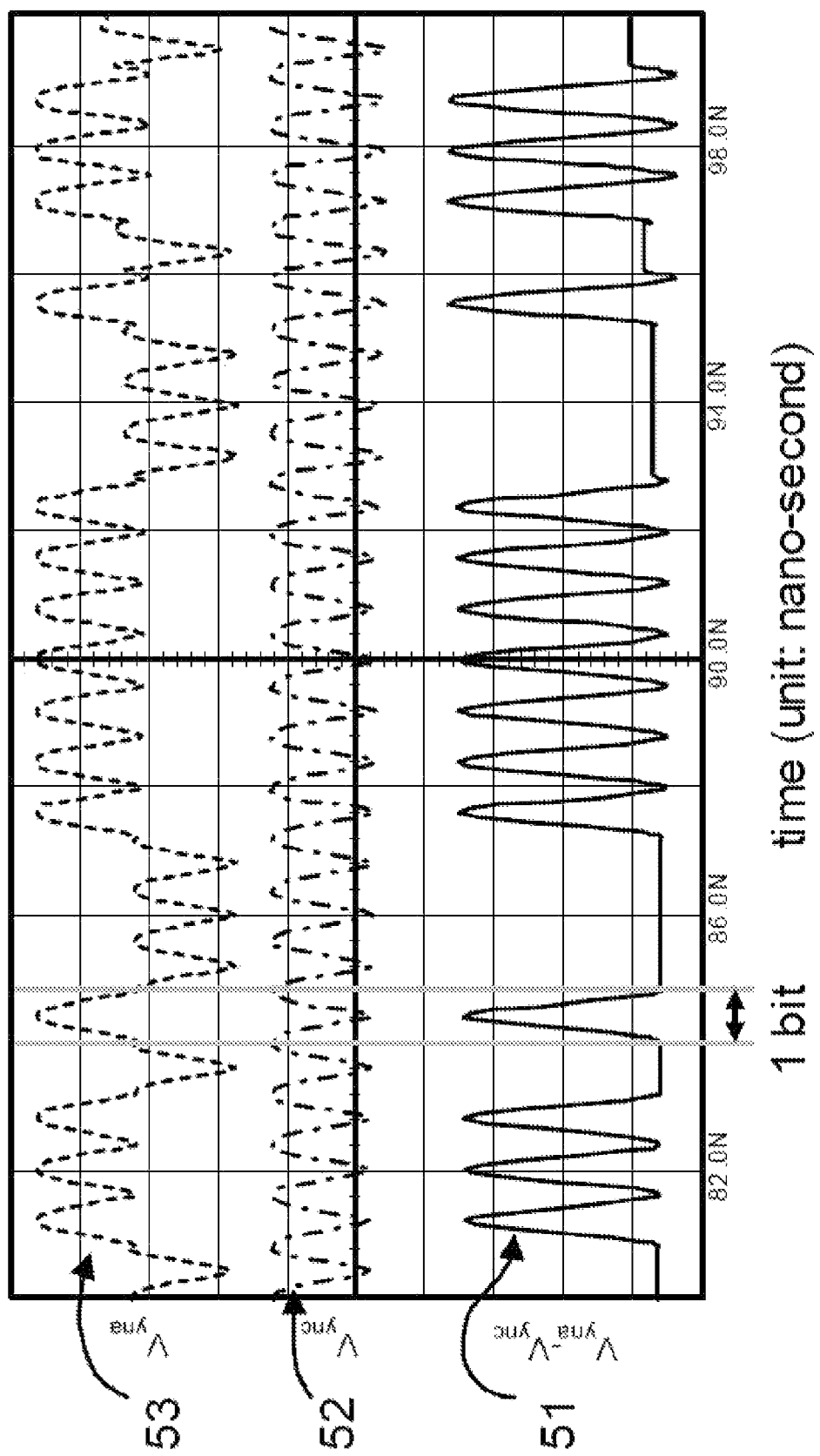
FIG. 5 shows a simulation result of the modulator of FIG. 4.

FIG. 5 is the simulation result of such switched oscillated modulator as shown in FIG. 4, in the figure:
- <51>: the electrical potential level difference between <49> and <50> in FIG. 4, which is the voltage across the waveguide capacitor <41> in FIG. 4;
- <52>: the electrical potential level of <49> in FIG. 4;
- <53>: the electrical potential level of <50> in FIG. 4;

In this simulation, the electro-optic modulation circuit in FIG. 4 is driven by RZ data. The resulted voltage <51> across the waveguide capacitor <41> represents the charge stored in the waveguide capacitor at any transient time. Therefore, <51> also represents the optical phase modulation in the free-carrier dispersion based electro-optic modulator.

INVENTION EMBODIMENT 3

Waveguide Capacitor for Electro-Optic Modulator Circuits

Figure 6:
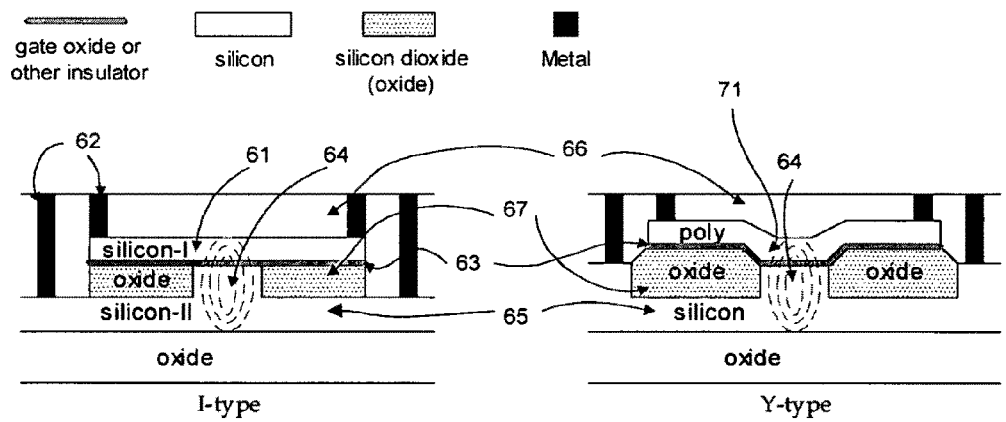
FIG. 6 shows an I-type waveguide capacitor embodiment and a Y-type waveguide capacitor embodiment.
Figure 7:
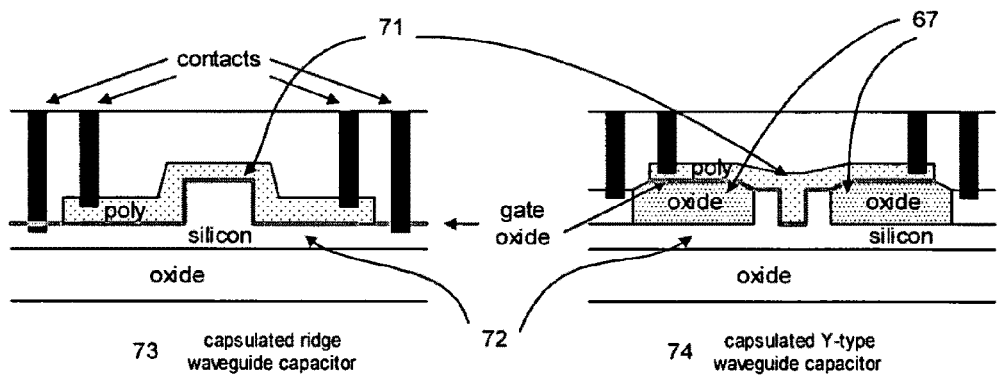
FIG. 7 shows capsulated waveguide capacitor embodiments.
Figure 8:
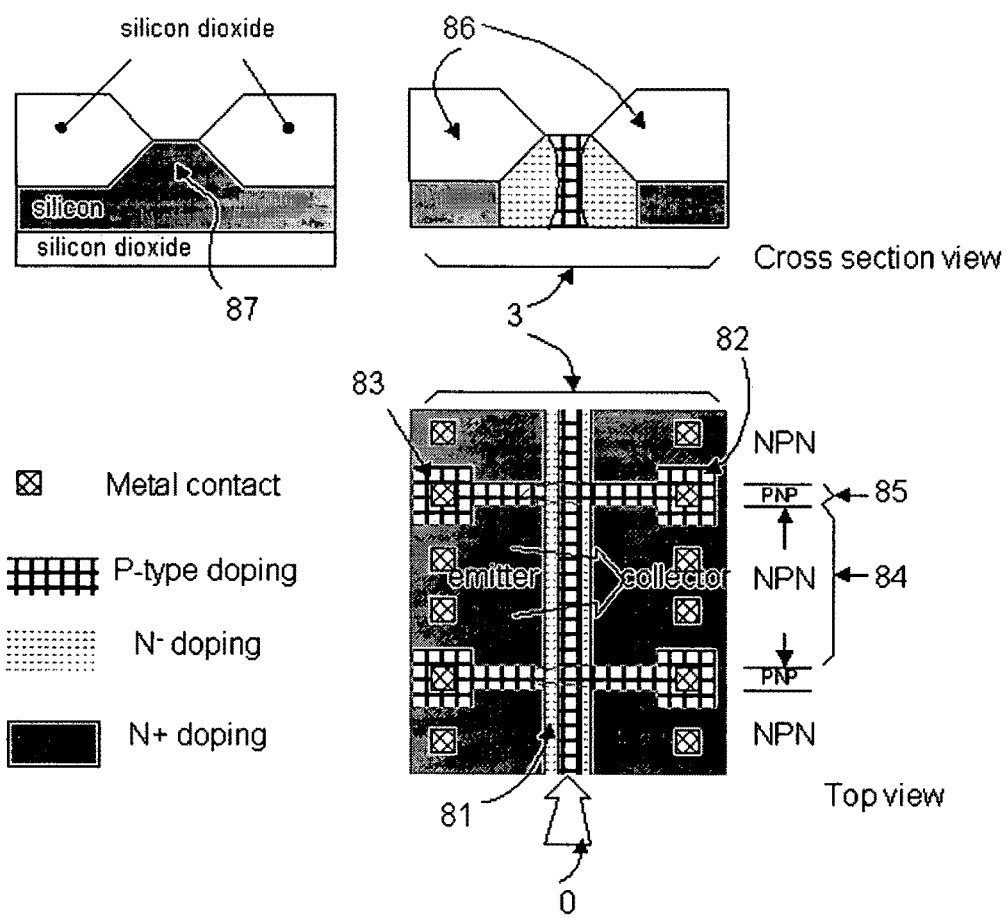
FIG. 8 shows an embodiment of a bipolar transistor junction waveguide capacitor.

Another part of this invention is three new modulator waveguide capacitor structures. They are: (1) the I-type or Y-type of waveguide with gate capacitor (FIG. 6); (2) capsulated waveguide capacitor (FIG. 7); (3) bipolar transistor junctions (FIG. 8).

The I-type or Y-type of waveguide with MOS capacitor is shown in FIG. 6, in the figure:
- <61>: silicon area I;
- <62>: metal contact;
- <63>: gate oxide or other gate insulator in MOS;
- <64>: the optical mode illustration in the waveguide of the modulator;
- <65>: silicon area II;
- <66>: passivation oxide, also the top cladding of the optical waveguide;
- <67>: field oxide of the MOS transistor;

For the I-type waveguide capacitor, as shown in the left of FIG. 6, the surface is CMP to flat after the field oxide deposition or thermal growth. The silicon-II <65> is the original silicon layer of the SOI wafer, and the silicon-I can be the poly silicon deposited, or single crystal silicon grown, on top of finished surface after gate oxide and field oxide. For the Y-type waveguide capacitor, as shown in the right of FIG. 6, the field oxide is the result of the selective thermal oxidation, and no CMP process after it. The poly silicon <71> is then deposited on top.

In both I-type and Y-type, there is a thin gate oxide <63> thermal grown before poly silicon deposition or silicon-I growth. This thin gate oxide guarantees the high capacitance between <61> and <65>, and between <71> and <65>.

The I-type/Y-type waveguide is generally a waveguide structures that have the high index ridge existing between two high index slabs. The top high index slab can be flat, or not flat according to the process. No-flat top slab is usually an advantage to form a more lateral confined guiding mode. The lateral confinement to the lightwave is provided by the effective index difference just like in the regular ridge waveguide. The mode will be mainly confined at the center part defined by the ridge. Therefore, the contacts to the both slabs with enough distance from the center will have no effect to the mode.

The capsulated waveguide capacitor is shown in FIG. 7, in the figure:
- <71>: poly silicon layer;
- <72>: single crystal silicon layer, which is the silicon layer of the SOI wafer;
- <73>: capsulated ridge waveguide capacitor;
- <74>: capsulated Y-type waveguide capacitor;

In <73>, after the gate oxide growth or deposition, the silicon ridge is capsulated by the poly silicon film <71>. The shape of the ridge is reserved after capsulation. Therefore, the lateral confinement is reserved as well. The contact away enough from the ridge has no effect to the guiding mode. And the thin gate oxide makes sure the sufficient capacitance between the poly silicon and the crystal silicon layer underneath.

In <74>, it is a Y-type waveguide with a slot in the middle of the silicon ridge. After the gate oxide growth or deposition and the field oxide deposition (outside the slot), the slot is filled by the poly silicon film <71>, which is conductive. The capacitor exists between the poly film and the crystal silicon underneath the gate oxide. The pros of this structure are that the capacitor is more overlapped with the center of the optical guiding mode, and the field oxide make the poly silicon and crystal silicon further apart (therefore, less capacitance) at the location where no significant optical field due to the lateral confinement of the guiding mode.

FIG. 8 is the illustration of the third modulator capacitor: the bipolar transistor junction, in the figure:
- <81>: the base of the lateral PNP bipolar transistor;
- <82>: the emitter contact of the lateral PNP transistor, also the base contact of the lateral NPN transistor;
- <83>: the collector contact of the lateral PNP transistor;
- <84>: the NPN section of the waveguide capacitor;
- <85>: the PNP section of the waveguide capacitor;
- <86>: the field oxide of the SOI-CMOS;
- <87>: the ridge of the SOI ridge waveguide;

In this bipolar transistor junction structure, the complementary lateral bipolar transistor pair is made out of the ridge waveguide by implants. Using the field oxide as implant mask, the base implant can be self-aligned. A base width as narrow as top ridge width can be achieved. In this bipolar transistor modulator structure, the base width needs to be as narrow as possible to improve the operation speed. The waveguide will be designed and fabricated in this way to make the base width narrow. One effective way is to use the selective thermal oxidation to form the field oxide and the waveguide ridge. The top of the base (waveguide ridge), can have more density of doping to reduce the resistance, however, the trade-off needs to be played between resistance and the waveguide loss.

As we can see from the top view in FIG. 8, the both side of the ridge are implanted in N-type. Heavier doping needed in the area further away from the ridge to improve the quality of the contact and reduce the series resistance of the emitter and the collector (for the NPN transistor). For the NPN transistor, the electron flows from the left to right (from emitter to the collector). The base of the NPN is at the center of the ridge, and its contact doping and contact itself of the NPN is on the right side of the ridge (as an example), which directly connects to the waveguide ridge. On the left side, another P-type doping area exists, it is there to turn the parasitic base-emitter current of the NPN transistor into a collector current of a PNP transistor. Please notice that the P-type doping on the left (the collector of the PNP) does not contact the ridge base, and there is a narrow N-type doping between them, which functions as the base of the PNP.

By the complementary bipolar transistor pair, the slow parasitic emitter-base current of the NPN can be turned to a fast collector current of PNP.

By the self-aligned base doping, this bipolar transistor modulator can operate very fast. As a bipolar transistor by itself, it brings the gain into the modulator junction. The voltage-controlled current source in FIG. 1 only needs to drive the base capacitance, while the overall charging is then amplified by the bipolar transistor itself. The charge current is β times larger than the base current coming from the driving current source, where β is the current gain of the bipolar transistor.

INVENTION EMBODIMENT 4

Traveling Wave Modulator Circuit Utilizing Slow Wave Structure

Figure 9:
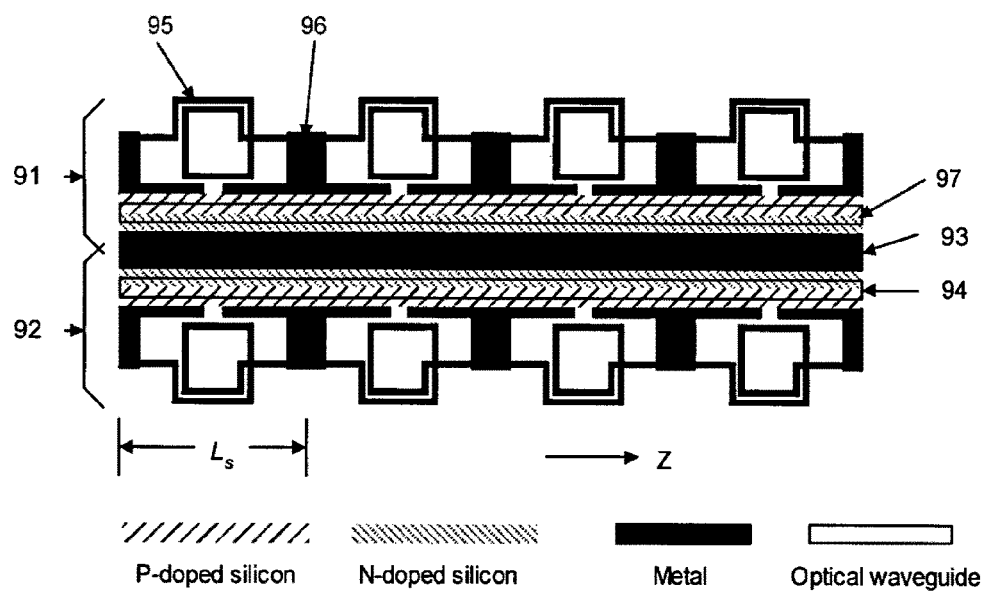
FIG. 9 shows a slow-wave transmission line electrode in an embodiment of a slow-wave modulator circuit.

The invention embodiment here is to construct slow traveling wave structure for both electrical signal and lightwave in the modulator circuit. The electrical slow traveling wave structure is a quasi-transmission line, as shown in FIG. 9. The black solid pattern is the electrode, the p-doped region and n-doped region of the semiconductor, along with the optical waveguide underneath the electrode are shown in the figure by different filling pattern. The doped semiconductor (silicon in this embodiment) will be electrical connected through the contacts. The optical waveguide position is indicated. But the exact geometry of the waveguide will be described later. In FIG. 9:

<91>: the slow-wave transmission line constructed by inductor-capacitor chain driving the $1^{st}$ waveguide arm <97> of the MZI, in the said inductor-capacitor chain, the capacitor comprises both the capacitance of the metal electrode and the capacitance of the waveguide capacitor (PN junction in this embodiment) of the modulator;

<92>: the slow-wave transmission line constructed by inductor-capacitor chain driving the $2^{nd}$ waveguide arm <94> of the MZI, in the said inductor-capacitor chain, the capacitor comprises both the capacitance of the metal electrode and the capacitance of the waveguide capacitor (PN junction in this embodiment) of the modulator;

<93>: the common ground line of <91> and <92>;

<94>: the $2^{nd}$ waveguide arm of the Mach-Zehnder Interferometer;

<95>: the inductor of one segment of the inductor-capacitor chain;

<96>: the capacitor (electrode part) of the one segment of the inductor-capacitor chain;

<97>: the $1^{st}$ waveguide arm of the Mach-Zehnder Interferomeer;

In FIG. 9, the section length $L_s$ needs to be small enough compared to the electrical wavelength of the highest frequency in the driving signal 担 bandwidth.

To make this slow electrical traveling wave structure can be applied into the modulator, the optical waveguide must be a slow optical traveling wave structure, in which longitudinal traveling speed of the lightwave matches with the traveling speed of the electrical signal in the slow-wave transmission line. There are varieties of the approaches to realize such slow-wave optical structure.

Figure 10:
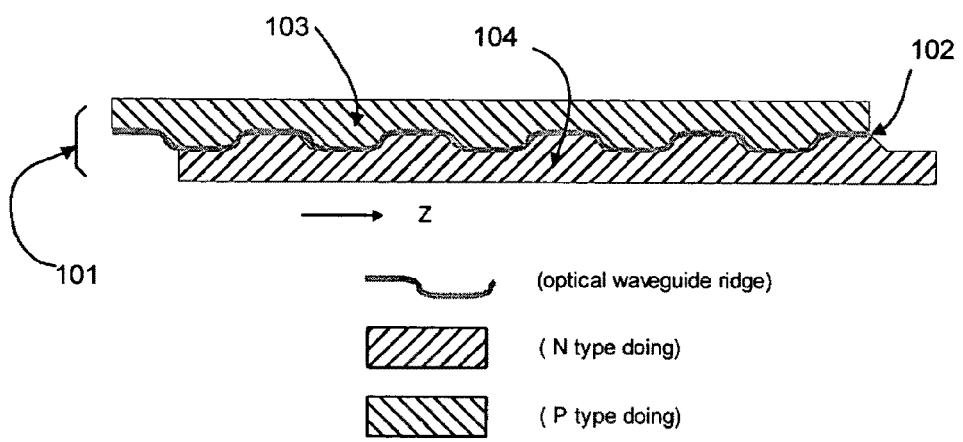
FIG. 10 shows an embodiment of a slow-wave optical waveguide.
Figure 11:
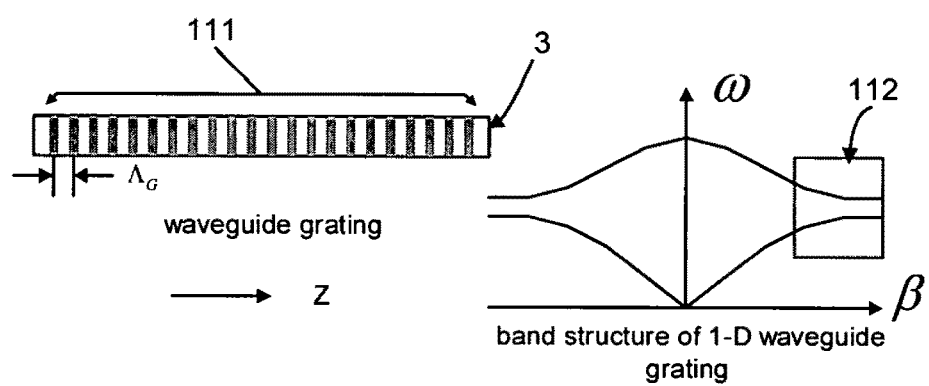
FIG. 11 shows an embodiment of an optical waveguide with grating.

FIG. 10 shows one example of the slow-wave optical waveguide: a periodically bended optical waveguide, in the figure:

<101>: periodically bended optical waveguide as slow-wave waveguide capacitor;

<102>: the trace of optical waveguide, illustrated by the waveguide ridge in the slow-wave optical structure embodiment;

<103>: the P-type doping area of the waveguide capacitor (PN junction in this slow-wave waveguide capacitor embodiment);

<104>: the N-type doping area of the waveguide capacitor (PN junction in this slow-wave waveguide capacitor embodiment);

FIG. 11 shows another example: an optical waveguide with grating, in the figure:

<111>: the waveguide grating;

<112>: the region in the photon energy band structure of the waveguide grating (1-dimensional photonic crystal) where the velocity of the photon is approaching to zero;

The curve section outlined by the red box <112> has very small $$V_{og} = \frac{d\omega}{d\beta},$$

which is the group velocity of the guiding mode along the waveguide grating.

One of the most important advantages of having slow wave traveling wave structure is to reduce the power consumption of the modulator circuit. Due to the charge accumulated in the waveguide capacitor is proportional to the voltage between its two terminals, low power consumption will require high impedance of the electrical traveling wave structure, which in turns, require high distributive inductance. However, increasing the distributive inductance in conventional transmission line will inevitably slow down the electrical signal propagation. By slowing down the lightwave propagation as well, the group velocity of the light can be re-aligned with the propagation velocity of the electrical signal along the electrode after its inductance is intentionally increased, therefore maintain the bandwidth of the modulator circuit.

What is claimed is:
1. A slow wave structure waveguide comprising:
   an optical waveguide comprising a waveguide grating; and an inductor waveguide capacitor chain structure comprising a plurality of segments oriented in series along a length of said optical waveguide, each segment comprising:
   a waveguide capacitor; and
   a metal inductor;
wherein a traveling speed of an optical lightwave in said optical waveguide matches a traveling speed of an electrical signal in said inductor-waveguide capacitor chain structure, and a wavelength of said optical lightwave is outside a stop-band of said grating.

2. The slow wave structure waveguide of claim 1, wherein a section length of a segment is much smaller than a wavelength of a highest frequency of said electrical signal.

3. The slow wave structure waveguide of claim 1, wherein said metal inductor comprises a metal coil.

4. A slow wave structure waveguide comprising:
an optical waveguide; and
an inductor waveguide capacitor chain structure comprising a plurality of segments oriented in series along a length of said optical waveguide, each segment comprising:
   a waveguide capacitor; and
   a metal inductor;
wherein a traveling speed of an optical lightwave in said optical waveguide matches a traveling speed of an electrical signal in said inductor-waveguide capacitor chain structure;
wherein said optical waveguide comprises a periodically bended optical waveguide.

5. The slow wave structure waveguide of claim 4, wherein said periodically bended optical waveguide has a period shorter than a section length of a segment.

6. The slow wave structure waveguide of claim 1, wherein said optical waveguide is a first optical waveguide and said inductor waveguide capacitor chain structure is a first inductor waveguide capacitor chain structure, further comprising a second optical waveguide extending parallel to said first optical waveguide.

7. The slow wave structure waveguide of claim 6, further comprising a second inductor waveguide capacitor chain structure comprising a plurality of segments oriented in series along a length of said optical waveguide, each segment comprising:
   a waveguide capacitor; and
   a metal inductor.

8. The slow wave structure waveguide of claim 7, wherein said first inductor waveguide capacitor chain structure comprises a mirror image of said second inductor waveguide capacitor chain structure.

9. The slow wave structure waveguide of claim 7, comprising a Mach-Zehnder interferometer.

10. The slow wave structure waveguide of claim 7, comprising a ground common to the first and second inductor waveguide capacitor chain structures.

11. The slow wave structure waveguide of claim 10, wherein said ground is oriented between the first optical waveguide and the second optical waveguide.

12. A method comprising:
providing a slow wave structure waveguide as recited in claim 7;
applying a first electrical signal to said first inductor waveguide capacitor chain structure and applying a second electrical signal to said second inductor waveguide capacitor chain structure;
wherein a phase of the first electrical signal is opposite a phase of the second electrical signal.

13. A slow wave structure waveguide comprising:
an optical waveguide comprising a waveguide grating; and
an inductor waveguide capacitor chain structure comprising a plurality of segments oriented in series along a length of said optical waveguide, each segment comprising:
   a waveguide capacitor; and
   a metal coil inductor;
wherein a wavelength of an optical lightwave in said optical waveguide is outside a stop-band of said grating.

* * * * *